Patented July 4, 1950

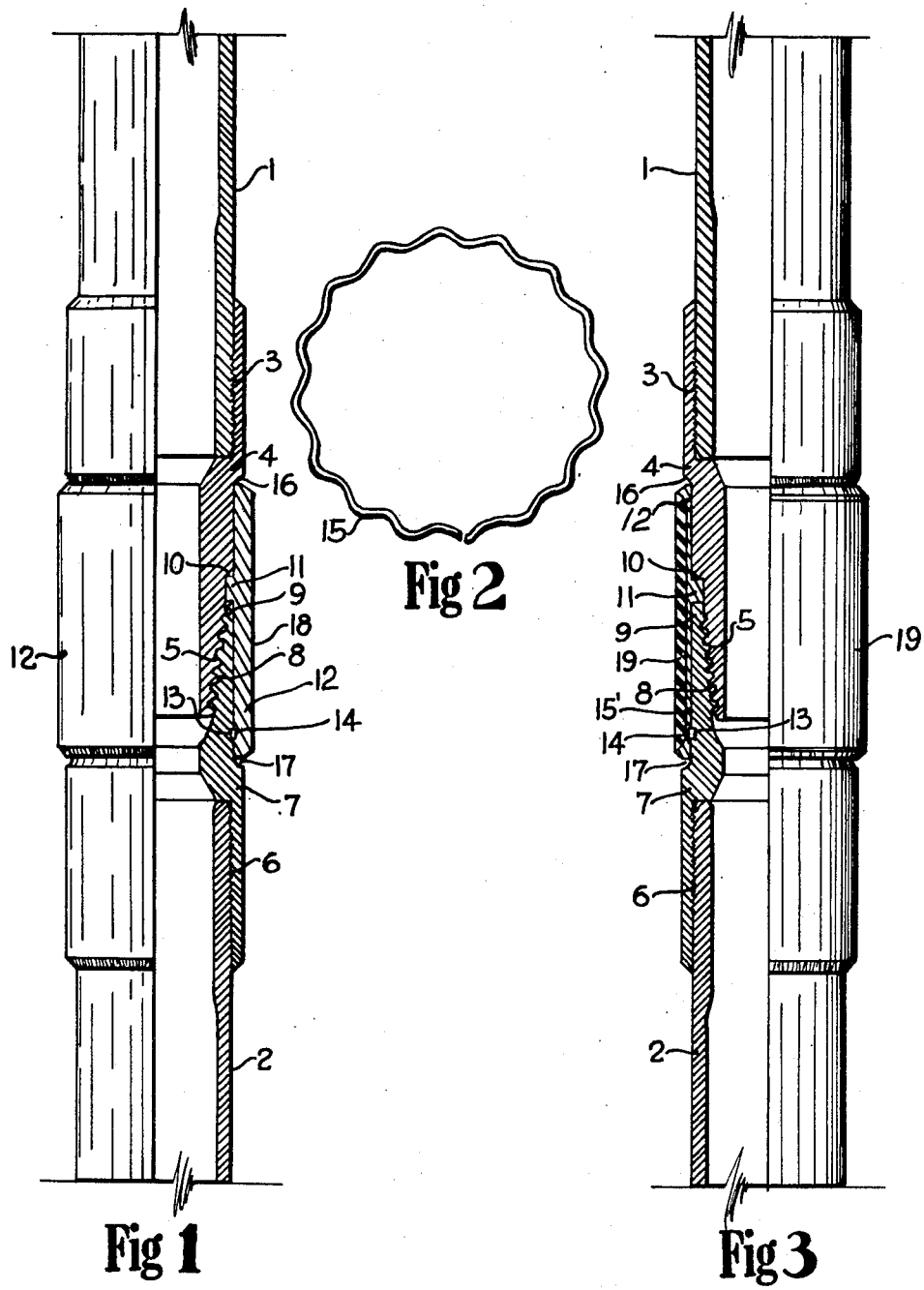

2,513,621

UNITED STATES PATENT OFFICE 2,513,621

TOOL JOINT WEAR COLLAR

Elvin G. Boice, Houston, Tex., assignor to Reed Roller Bit Company, Houston, Tex., a corporation of Texas Application February 8, 1946, Serial No. 646,460

7 Claims. (Cl. 308—4)

1

This invention relates to tool joints and refers more particularly to interchangeable wear collars or sleeves for tool joints which may be readily shifted from one position to another in a drill stem.

Wear collars for tool joints have been used heretofore and in some instances were adapted to be assembled in one position within a drill stem and transferred or shifted to another drill stem position. However, in the conventional sleeves of this type, no provision has been made to resist accidental displacement of the wear collar from the coupling member with which it is associated when the joint is dismantled. For this reason, when the drill stem is withdrawn from the well bore, the collars, if left in association with one of the couplings as the stem is dismantled, are subject to accidental displacement therefrom. Obviously displacement of the wear collar from the stacked stem sections might result in bodily injury or property damage. In addition, when the wear collars are loosely associated with one of the coupling members of a dismantled tool joint, the assembly of the joint might in some instances prove troublesome.

An object of this invention is to provide a wear collar for protection of a tool joint which may be readily shifted from one position in a drill stem to another but which is not likely to be accidentally displaced from the coupling member with which it is associated when the tool joint is dismantled.

Another object is to provide an interchangeable wear collar with means to resist accidental displacement from a dismantled tool joint coupling member.

A further object is to provide a tool joint having a protective wear collar with a spring member cooperable between one of the coupling members and the wear collar to resist accidental displacement of the wear collar therefrom when the joint is dismantled.

The other and further objects will appear from the following description.

An understanding of the present invention may be more quickly obtained by referring to the accompanying drawing, in which:

Fig. 1 is a fragmentary elevational view partly in section of a well tool having a wear resisting sleeve surrounding a joint and associated therewith in accordance with the present invention.

Fig. 2 is a similar view showing a wear sleeve having a modified wear resisting surface.

Fig. 3 is a plan view of a split ring employed in attaching the wear sleeve to one of the coupling members.

2

As shown in the accompanying drawings the features of the present invention are embodied in a tool joint. The tool comprises upper and lower tubular sections 1 and 2. Section 1 is externally threaded and has screwed thereon, an internally threaded portion 3 of a male coupling member 4. This coupling member has its other end provided with an external tapered or pipe thread 5. Lower section 2 is externally threaded to receive the internally threaded portion 6 of a female coupling member 7. As shown, the other end of the coupling member 7 has a tapered socket provided with an internally tapered or pipe thread 8 and adapted to receive and thereby be coupled to the externally threaded portion of coupling member 4.

It will be noted that the threads on the ends of the tubes 1 and 2 are much finer than the tapered or pipe threads 5 and 8. This enables threads 5 and 8 to be unthreaded without loosening of the threaded connections between the coupling members and the tubes 1 and 2.

The tapered or pipe threaded ends of the coupling members 4 and 7 are so constructed that when a tight connection is formed between them the extreme end face 9 of the member 7 will be spaced from the shoulder 10 of the member 4. This provides axially spaced abutments between which lie the inwardly extending flange 11 of a wear sleeve or collar 12.

Coupling member 7 is provided with a circumferential groove 13 in its exterior surface. A circumferential groove 14 is provided on the inner surface of the sleeve 12 and is located so as to register with groove 13 in the coupling member 7 when the flange 11 of sleeve 12 lies against the end face or abutment 9 of the lower coupling member 7. A spring member or split ring 15 of spring material and corrugated as illustrated in Fig. 2 is provided and is adapted to be inserted in one of the grooves 13 and 14 before the sleeve 12 is placed on the coupling member 7 or before the sleeve is slid down on the coupling member to bring the groove 14 in register with groove 13. The snap ring 15 is placed in one of the grooves 13 or 14 and compressed in the groove to permit the sleeve to be slid on the lower coupling member, then when the grooves 13 and 14 register the ring will snap into a position in which it will be partly in both grooves. When the snap ring lies partly in both grooves the sleeve 12 will be secured against axial movement relative to the coupling member 7. This construction prevents the sleeve or collar 12 being displaced from the coupling member 7 either prior to forming a joint or after breaking the same.

If desired the coupling members may have portions 16 and 17 of reduced diameter to receive the sleeve 12.

It will be noted that the sleeve surrounds portions of both coupling members but is connected by groove 13 and groove 14 with only one coupling member. While the sleeve is shown connected with the lower coupling member it may be of course connected instead with the upper coupling member. Also, it is contemplated that the groove 13 may be dispensed with and the friction of spring member 15 against the surface of the box relied upon to position the wear collar. However, this resistance to accidental displacement of the collar is not as reliable as the preferred construction which includes the groove 13.

The present invention contemplates the hardening of the surface of the wear sleeve or collar 12 such as by heat treating or coating with other materials. In the form of invention shown in Fig. 1 the surface of the sleeve 12 is provided with a coating 18 of tungsten carbide. When coated with tungsten carbide the wear sleeve 12 is especially adapted for work below the end of the casing where the sleeve will be subject to engagement with the surrounding formation, but is not desirable for use on tool joints operating within the casing because of the abrasive action of the collar on the casing.

It is also within the contemplation of the present invention to coat the surface of the wear sleeve with material such as rubber. Fig. 3 of the drawings illustrates a joint in which the wear sleeve is coated with rubber. Most of the parts of Fig. 2 are identical to those of Fig. 1. As shown in Fig. 2 of the drawings the wear sleeve has a recess formed in its outer surface in which is positioned a surrounding body of rubber 19 which may be molded and vulcanized in place, the rubber being thoroughly bonded to the metal surface of the sleeve 12'. This type collar is preferred for use within the well casing.

In all forms of the invention the external diameter of the wear sleeve or collar is greater than that of the coupling member and tubes thus insuring that the wear sleeves will be subjected to the greatest degree of contact with the surrounding casing or formation.

In operation the drill stem is assembled in more or less conventional manner, an additional length or section of pipe being added when permitted by the depth of the well bore. As each pipe section is added to the drill stem the tool joint of this invention is employed. The wear collar 12 is placed over the box 7 of the joint and forced to the position in which a flange 11 of the collar rests on the face 9 of the box. When in this position the spring member 15 is in position in the grooves 13 and 14 and offers resistance to axial movement of the collar relative to coupling member 7. However, this resistance is of a limited character and removal of the wear collar may be readily accomplished by use of standard tools or drilling rig equipment. This construction reduces the likelihood of accidental displacement of the collar and in addition, the assembly of the tool joint is facilitated by the tight fit of the collar on the box.

As the drilling progresses the operator is careful to shift the wear collars into various positions throughout the drill stem so that the collars protecting the joints which will operate beneath the lower extremity of the casing will have a hard outer surface such as that shown in Fig. 1. On the other hand the joints operating within the well casing are preferably protected by wear collars as shown in Fig. 3.

It is contemplated that standard or conventional coupling members may be modified for use in accordance with this invention. This modification is accomplished by slightly reducing the outer diameter of the portion of the box 7 and the pin 4 so that the wear collar can be inserted thereon. Also, it is necessary to cut off the end of the box member an amount equivalent to the thickness of the flange 11 of the wear collar. These modifications are simple and may be readily made. However, it is contemplated that the box or pin member may be manufactured directly so that they are adaptable for use in accordance with this invention. It is to be noted that in modifying the box the tapered threads of the member are not in any way disturbed and the full thread length remains intact.

It will be seen that the objects of the invention have been accomplished. There has been provided a wear sleeve or collar for protecting tool joints, which in operation may be readily transferred from one joint to another throughout the drill stem and which may be positively and removably associated with one of the coupling members of the joint. The arrangement is such that a seal is formed between the coupling members and the wear collar flange when the joint is assembled. The construction is such that the coupling members of a standard tool joint may be readily modified for use in this invention.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. In a tool joint including coupling members and an interchangeable wear collar partially encasing at least one of the coupling members, the improvement which comprises an annular groove in the inner surface of the wear collar confronting one of the coupling members and a rigid spring member within said groove and engaging said coupling member whereby the spring member between the collar and one of the coupling members resists accidental displacement of the collar from said last mentioned coupling member when the joint is dismantled.

2. A joint as in claim 1 wherein the wear collar partially encases both the coupling members.

3. A joint as in claim 1 wherein the spring member is a corrugated metal split ring.

4. A wear collar adaptable for interchangeable use in conjunction with a tool joint including coupling members comprising a sleeve, an inturned flange on the sleeve adaptable to be held in sealing engagement in the connection of the tool joint, an annular groove on the inner surface of the sleeve and a rigid spring member associated with said groove for engaging one of the coupling members when the collar is associated therewith to resist accidental displacement of the collar therefrom when the joint is in a dismantled condition.

5. A tool joint comprising cooperating coupling members, a wear sleeve partially encasing at least one of said coupling members, one of said coupling members having a circumferential groove in its external surface, said sleeve having a circumferential groove in its inner surface registering with the groove in said coupling member, and a rigid spring member cooperating with both said grooves to resist accidental displacement of the sleeve from the grooved coupling member with the joint dismantled.

6. A tool joint comprising cooperating coupling members, a wear sleeve partially encasing at least one of said coupling members, one of said coupling members having a circumferential groove in its external surface, said sleeve having a circumferential groove in its inner surface registering with the groove in said coupling member, and a split corrugated ring of rigid material residing in the space provided by both of said grooves to resist accidental displacement of the sleeve from the grooved coupling member, with the joint dismantled.

7. A tool joint comprising cooperating coupling members, a wear sleeve partially encasing at least one of said coupling members, said coupling members having axially spaced abutments, said sleeve having portions engageable with said abutments and adapted to be gripped between said abutments, one of said coupling members having a circumferential groove in its external surface, said sleeve having a circumferential groove in its inner surface registering with the groove in said coupling member, and a rigid spring member cooperating with both said grooves to resist accidental displacement of the sleeve from the grooved coupling member with the joint dismantled.

ELVIN G. BOICE.

REFERENCES CITED

The following references are of record in the file of this patent:

UNITED STATES PATENTS

| Number | Name | Date |
| --- | --- | --- |
| 1,518,960 | Bowser | Dec. 9, 1924 |
| 1,556,745 | Banta | Oct. 13, 1925 |
| 2,147,063 | Sanford, Jr. | Feb. 14, 1939 |
| 2,320,107 | Speckert | May 25, 1943 |